Sept. 26, 1933.  A. Y. DODGE  1,928,051
BRAKE
Filed Oct. 12, 1928   2 Sheets-Sheet 1

INVENTOR.
Adiel Y. Dodge
BY M. W. McConkey
ATTORNEY.

Sept. 26, 1933. A. Y. DODGE 1,928,051
BRAKE
Filed Oct. 12, 1928 2 Sheets-Sheet 2

INVENTOR.
Adiel Y. Dodge
BY
M. W. McConkey
ATTORNEY

Patented Sept. 26, 1933

1,928,051

UNITED STATES PATENT OFFICE 1,928,051

BRAKE

Adiel Y. Dodge, South Bend, Ind., assignor to Bendix Brake Company, South Bend, Ind., a corporation of Illinois Application October 12, 1928. Serial No. 312,039

15 Claims. (Cl. 188—79.5)

This invention relates to brakes, and is illustrated as embodied in an internal expanding brake for an automobile. An object of the invention is to provide a readily-adjusted guide for a portion of the brake friction means.

In one desirable arrangement, the novel guiding means controls a portion of the friction means, for example an unanchored friction shoe having an operative connection with another shoe which may engage an anchor taking the torque of both shoes. The present invention relates to the adjustment of a guide of this character, or of an equivalent positioning device, preferably by means such as a spring acting under the control of an operator, by releasing a clamping or holding device which permits the operation of the spring and which is then again tightened to preserve the adjustment permanently. The spring may also, if desired, be utilized as a return spring for the brake.

In the particular arrangements illustrated, the shoe and the guide member are interconnected by means of the pin-and-slot type, the guide member being pivoted so that the spring moves it to adjusted position with the brake applied, whereupon the guide plate is clamped permanently in place to preserve the adjustment. Ordinarily this is a factory adjustment and will not require resetting until new shoes are inserted in the brake after long use has worn out the original set.

The above and other objects and features of the invention, including certain particular structures especially suited for this adjustment, and various novel and desirable details of construction, will be apparent from the following description of the illustrative embodiments shown in the accompanying drawings, in which.

Figure 6:
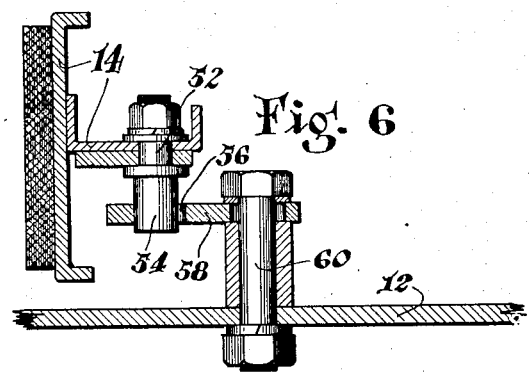
Figure 6 is a partial section on the line 6—6 of Figure 5, showing the modified guide.
Figure 8:
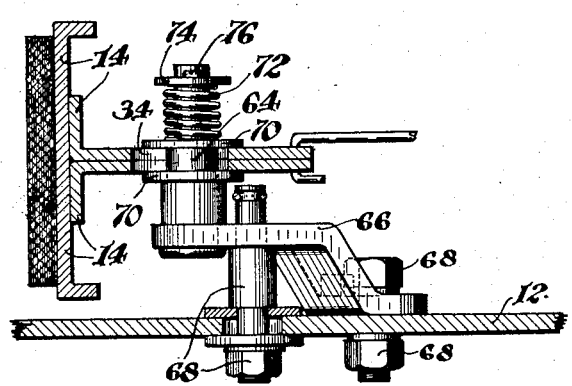
Figure 8 is a partial section on the line 8—8 of Figure 7, and showing the third guide.

The brake illustrated in all of the figures is an internal expanding brake of a well-known three-shoe type, and includes a rotatable drum 10, at the open side of which is a support such as a backing plate 12, and within which is arranged the friction means of the brake. The friction means of this particular brake includes a primary or servo shoe 14, unanchored and connected by means such as a floating pivot 16 to a secondary shoe 18 pivoted on a fixed anchor 20, together with an auxiliary shoe 22 mounted on a fixed pivot or anchor 24. As shown in Figures 6 and 8, the shoes may, if desired, be formed by welding together several separately-formed steel stampings to give a generally T-shaped construction with a stiffening web approximately in the center of the shoe.

The brake is applied by means such as a double cam 26 acting on U-shaped reinforcing members 28 doubled over the ends of the stiffening webs of shoes 14 and 22, the cam acting against the resistance of a main return spring 30. A steady rest 32 is shown adjacent the unanchored end of shoe 18.

According to the present invention, the shoe 14, or an equivalent part of the friction means of a brake of some other type, is provided with novel and readily adjustable guiding means, preferably acting in a general way like the guide described and claimed in prior application No. 233,754, filed jointly by myself and Roy S. Sanford.

Figure 1:
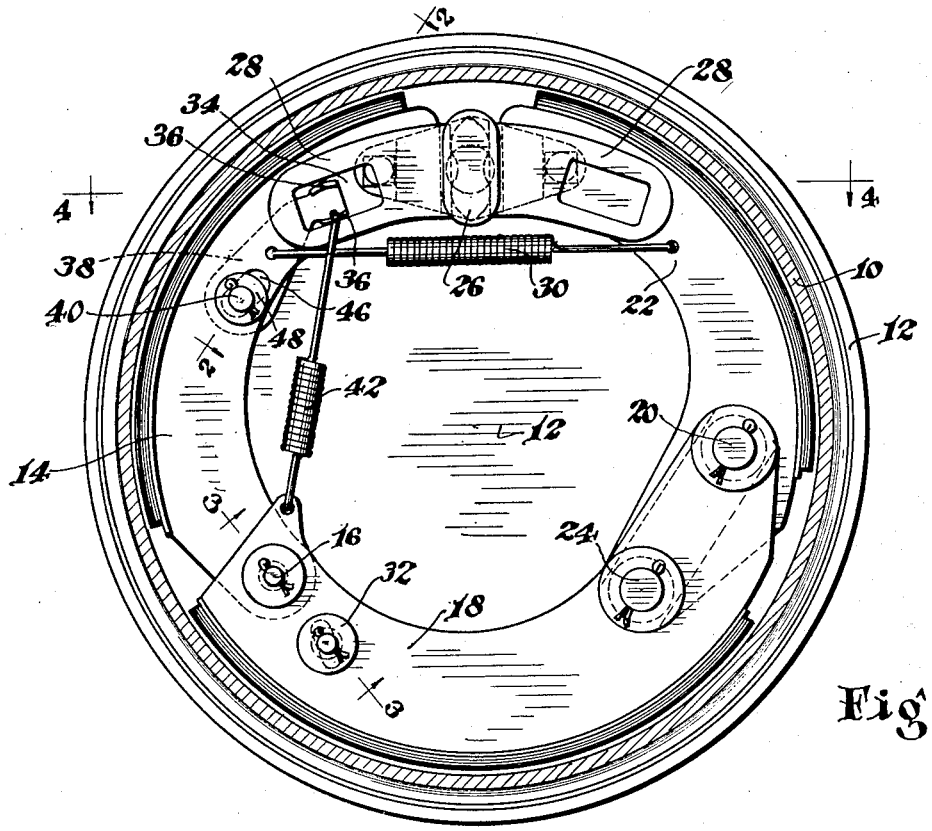
Figure 1 is a vertical section through the brake, just inside the head of the brake drum, and showing the brake shoes in side elevation.
Figures 2, 3, 4:
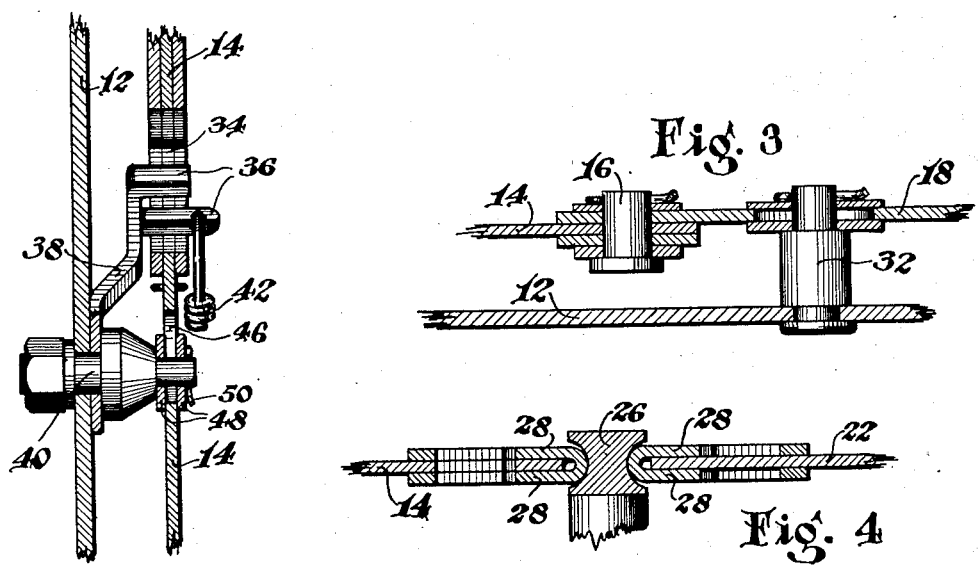
Figure 2 is a partial section on the line 2—2 of Figure 1, showing one form of guide.
Figure 3 is a partial section on the line 3—3 of Figure 1, showing the connection between two of the shoes.
Figure 4 is a partial section on the line 4—4 of Figure 1, showing the relation of the brake cam to the guide openings.

In the arrangement of Figure 1, the web of shoe 14 is formed with a guide or cam slot or opening 34, embracing laterally-extending projections 36 on a stamped steel arm 38 mounted on the backing plate by means of a clamping bolt or pivot 40 at its lower end. A coil spring 42 is preferably tensioned between the lower projection 36 and the unanchored end of shoe 18. This serves as an auxiliary return spring, against the resistance of which shoe 18 is applied; it also, however, serves as means for automatically adjusting the positioning device 38.

In the manufacture of the brake, after the various parts are assembled and adjusted, bolt 40 is loosened and the brake is applied. The shoe 14 moves to its applied position, and also forces shoe 18 to applied position aaginst the resistance of spring 42, while at the same time the lower projection 36 is held yieldingly against the lower edge of opening 34 by the spring 42. With the brake held so applied, bolt 40 is tightened again to preserve the adjustment of device 38 so made.

Whenever the brake is applied thereafter, the paths of movement of shoes 14 and 18 are controlled and predetermined by anchor 20, pivot 16, and by the lower edge of opening 34 riding or camming against the lower projection 36. Preferably this lower edge is inclined at such an angle that shoes 14 and 18 engage the drum substantially simultaneously, although this is not essential, as the object of the guide is rather to control shoe 18 so that it will not be forced suddenly against the drum as shoe 14 takes hold, with a snapping or jarring action.

Upon release of the brake, spring 42 functions to draw the secondary shoe 18 bodily upward, also aiding spring 30 in drawing shoe 14 circumferentially of the drum the slot 34 at its upper edge abutting the upper projection 36 of the arm 38. The upper projection 36 thus serves as a stop determining the released position of the shoe 14.

If desired, bolt 40 may be extended through an opening 46 in the web of shoe 14, and provided with washers 48 held by means such as a cotter pin 50, thus forming a steady rest for the shoe.

Figure 5:
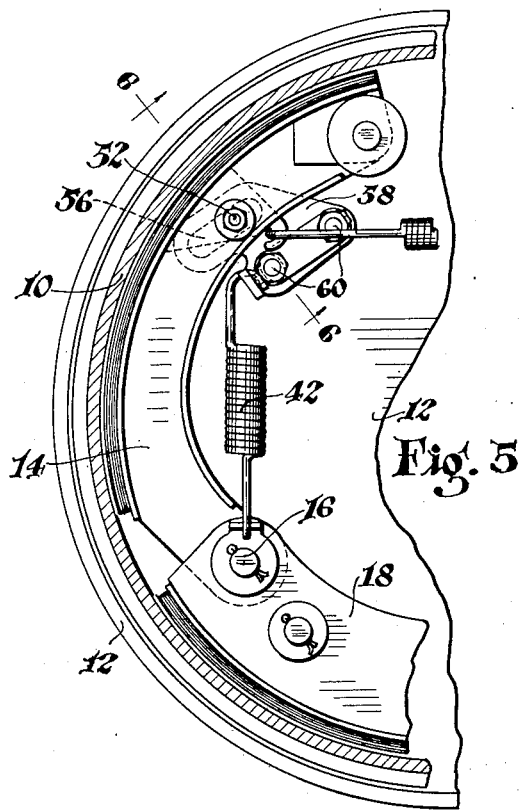
Figure 5 is a partial vertical section, corresponding to the left portion of Figure 1, but showing a modified form of guide.

In Figures 5 and 6, shoe 14 is provided with a laterally-projecting guide pin 52, on which a roller 54 may be mounted, the guide or cam slot 56 being in a member 58 corresponding to the arm 38. Member 58 is held by two clamping bolts 60, about the upper one of which it is pivoted by spring 42 when the bolts are loosened and the brake is applied, to make the adjustment as described above, the bolts then being tightened again as before.

Figure 7:
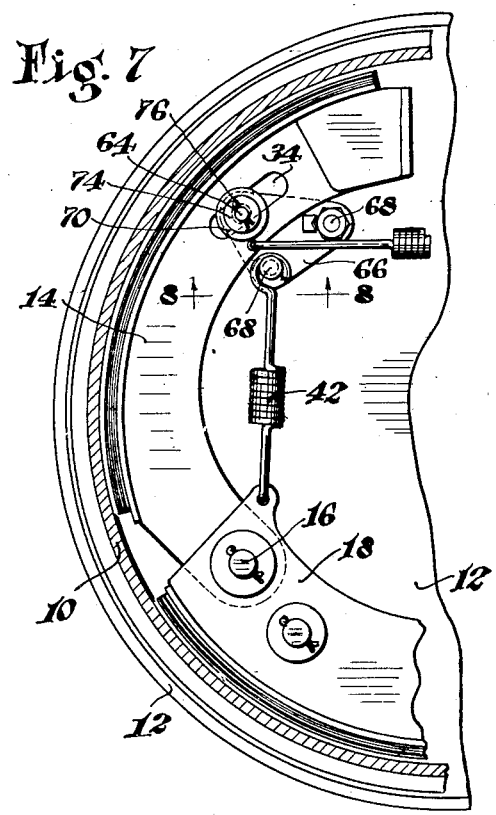
Figure 7 is a partial section, corresponding to Figure 5, but showing a third form of guide.

In Figures 7 and 8, the slot 34 is in the shoe web as in Figure 1, but embraces a separate pin 64 on a triangular lever member 66 held by two clamping bolts 68 arranged in a line paralleling slot 34. In this arrangement, with the bolts loosened and the brake applied, member 66 swings about the upper bolt 68 to adjusted position, whereupon the bolts are tightened. Pin 64 may have washers 70 embracing the shoe web and held by a coil spring 72 compressed by a third washer 74 held by means such as a cotter pin 76, thus forming a steady rest.

While several illustrative embodiments have been described in detail, it is not my intention to limit the scope of the invention to those particular embodiments, or otherwise than by the terms of the appended claims.

I claim:

1. A brake having, in combination, friction means, a guide comprising a pivoted lever having a part slidably guided and engaged by a portion of the friction means throughout the operation of applying the brake, means for adjusting the position of said guide by shifting the lever angularly about its pivot while the friction means is in applied position, and means for holding the guide in adjusted position.

2. A brake having an angularly-adjustable positioning device, in combination with a spring for actuating said device to adjust its position.

3. A brake having friction means and an angularly-adjustable positioning device, in combination with a spring for swinging said device to a position determined by the applied position of the friction means, to adjust the position of said device.

4. A brake comprising, in combination, friction means, a positioning device for the friction means, and a spring tensioned between the positioning device and a portion of the friction means and serving as a return spring for said portion of the friction means and also serving to adjust the position of said device.

5. A brake comprising, in combination, friction means, a positioning device for the friction means, and a spring serving as a return spring for a portion of the friction means and also serving to adjust the position of said device.

6. A positioning device for a brake comprising an arm adapted to be pivoted at one end and having a laterally-projecting guide at the other end, in combination with a spring acting on said other end and means holding said arm against the action of said spring.

7. A brake having at least two shoes connected by a floating joint, in combination with an adjustable guide for one shoe acting on the other shoe through said joint, together with spring means for shifting said guide to adjusted position when the shoes are in applied position.

8. A brake having at least two shoes connected by a floating joint, in combination with an adjustable guide for one shoe acting on the other shoe through said joint, together with spring means for shifting said guide to adjusted position when the shoes are in applied position, and means for securing the guide in said adjusted position and holding it against the tension of said means.

9. A brake having at least two shoes connected by a floating joint, in combination with an adjustable guide for one shoe acting on the other shoe through said joint, together with spring means for shifting said guide to adjusted position when the shoes are in applied position, said spring means also serving as a return spring for at least one of the shoes.

10. A positioning device for a brake formed with an inclined guide slot and provided with two clamping bolts.

11. A positioning device for a brake formed with an inclined guide slot and provided with two clamping bolts, in combination with a spring urging said device about one of the bolts as a pivot.

12. A brake comprising, in combination, a pair of shoes, one of which acts on the other and one of which has a laterally-extending projection, and a part adjacent said latter shoe which has a guide slot extending in the direction of brake-applying movement of said projection and which slot embraces said projection.

13. A brake comprising, in combination, a pair of shoes, one of which is anchored, the unanchored one of which acts on the anchored shoe and the unanchored one of which has a guide projection, and a part adjacent the unanchored shoe which has a guide slot extending in the direction of brake-applying movement of said projection and which slot embraces said projection.

14. A brake comprising, in combination, a pair of shoes, one of which is anchored, the unanchored one of which acts on the anchored shoe and the unanchored one of which has a guide projection, and a part adjacent the unanchored shoe which has a guide slot extending in the direction of brake-applying movement of said projection and which slot embraces said projection, said part being automatically-adjustable under the control of an operator.

15. A guide plate having a guide slot and bolt openings on a line approximately paralleling said slot and formed with means for the attachment of a spring.

ADIEL Y. DODGE.